J. E. JOHANSSON & C. G. TIGERSTEDT.
PROCESS FOR SAWING LOGS.
APPLICATION FILED SEPT. 15, 1915.

1,252,445.

Patented Jan. 8, 1918.

Inventors:
John Edward Johansson & Carl Gustaf Tigerstedt
By Attorneys,
Fraser, Ould & Myers

UNITED STATES PATENT OFFICE.

JOHN EDVARD JOHANSSON, OF HELSINGFORS, AND CARL GUSTAF TIGERSTEDT, OF ELIMÄ, FINLAND, RUSSIA.

PROCESS FOR SAWING LOGS.

1,252,445. Specification of Letters Patent. Patented Jan. 8, 1918.

Application filed September 15, 1915. Serial No. 50,773.

*To all whom it may concern:*

Be it known that we, JOHN EDVARD JOHANSSON, residing at Helsingfors, Finland, and CARL GUSTAF TIGERSTEDT, residing at Elimä, Finland, Russia, both subjects of the Emperor of Russia, have jointly invented a certain new Process for Sawing Logs, of which the following is a specification.

The object of the present invention is to provide an improved process for sawing lengths of wood such as logs so as to obtain with the usual machines, present in every sawmill, a much greater amount of sawed wood and wood available for export than could be obtained with the processes used up to the present time.

The annexed drawing illustrates the difference between the new and the old processes. Figures 1 to 4 show the sawing according to the new process, and Figs. 5 to 8, the same according to the old process, the cuts in both cases being shown by means of dotted lines. For the purpose of greater clearness the length of the log as related to its thickness, is considerably smaller than it is in reality.

Figure 2:
Fig. 2 shows the log seen from the top end.
Figure 4:
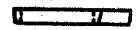
Fig. 4 shows the same board seen from the top end.
Figure 6:
Fig. 6 shows the log from the top end.
Figure 8:
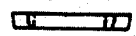
Fig. 8 shows the same board seen from the top end.
Figure 1:
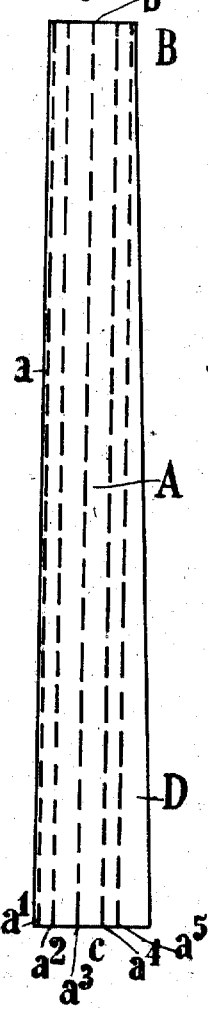
Fig. 1 shows the log seen from the side, and the cuts in the same.

As is seen from Fig. 1, the log, according to the new process, is so sawed in the saw gate that the saw blades follow a line substantially parallel to the side of the log A, as for instance side $a$, not as heretofore, parallel to a line connecting the middle points $b$ of the top end B and $c$ of the root end C. On adjusting the log A in the saw frame care is to be taken that the outside saw blade on the side $a$ producing cut $a'$ of the adjustment shall touch only the outside wood of the log throughout the entire length of the latter. This board taken on the surface of the log will be a refuse board of the full length of the log. The heartwood is then cut to suitable or necessary thickness as desired, as for instance by cuts $a^2$ to $a^5$. Upon the other side of the adjustment there is arranged a sufficient number of saw blades to simultaneously in the same working trip, saw the entire excess D of the log toward the root end in case it is not preferred to saw up this excess separately for boxboard, laths, etc.

Figure 5:
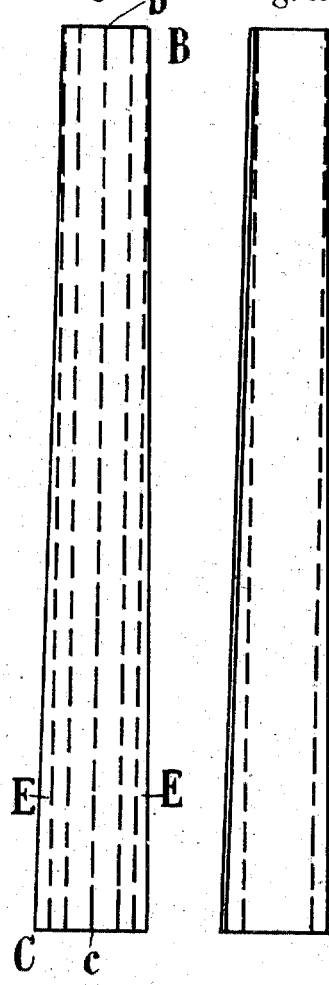
Fig. 5 shows the same log as Fig. 1, but the dotted lines indicate how the sawing takes place according to the old process.
Figure 7:
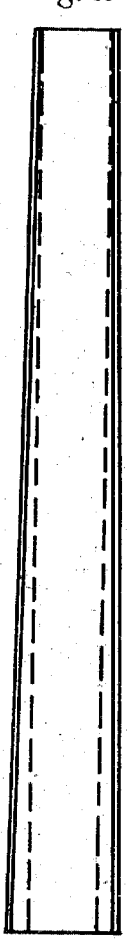
Fig. 7 shows one of the middle boards seen perpendicular to the plane of Fig. 5 and sawed according to the former process.

For the purpose of better comparison between the sawing operation in Fig. 1 and that in Fig. 5, we have shown the section D on the other side of the adjustment in Fig. 1 uncut, and the board thus obtained becomes refuse only at the upper end B, while in Fig. 5 the corresponding board E becomes entirely refuse. Moreover, it is directly evident that from the portion of this board D lying to the left, still more sawed-up goods are to be obtained, while the extreme forward portion of board E in Fig. 5 in general has only value for fuel.

The process can also be used with a slightly bent log. This is sawed like a straight log with the difference, however, that the curvature is laid horizontal, that is, with the bend to the one side, and the one managing the sawing has, in this case, during the work to so guide the log that the surface of the log is followed as in sawing straight logs. In this case it is preferable to follow the concave side of the log. More markedly bent logs are cut into suitable lengths.

In the case of cutting a log with four corners it is on the other hand adjusted in the first frame with the bend downward as usual.

Figure 3:
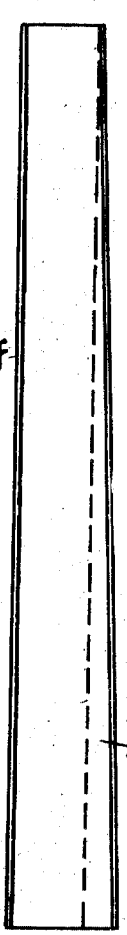
Fig. 3 shows one of the middle boards seen perpendicular to the plane in Fig. 1, and as the sawing of this board takes place according to the new process.

In trimming (Fig. 3) the same idea is carried out as in sawing is the first frame, that is, the trimming operation is substantially parallel to the side $f$ of the untrimmed board or plank, and there is cut off so much that the trimmed part F is an acute angled piece the length of the board or plank from which it was cut. The board is adjusted as usual according to the top measurement, and the trimming saw then cuts the entire conical shape F of the board off from the board. Thereby there is obtained almost all the refuse in one piece F lying to the right in Fig. 3, which evidently is much more advantageous than to obtain the refuse as previously in two pieces located on opposite sides of the board. Out of these pieces there are cut then slating battens, broomsticks, laths, and the like.

The output in this operation of sawing, as is easily understandable, becomes considerably greater than previously from the fact that the greater portion of the cone shape of the log is obtained in the form of lumber. Comparative experiments made and lasting for several weeks have shown that to produce a standard amount of lumber, on the average only about 200 cubic feet of round log was necessary by our invention, while on the other hand the old sawing process required 260 to 270 cubic feet. In both cases the refuse arising was not calculated. Moreover, with the new sawing process there is still obtained about ten per cent. slating-battens, broomsticks, and the like.

What we claim is:—

1. The process of sawing tapered logs into boards and the like by producing a plurality of parallel cuts therein, all the said cuts being substantially parallel with one side of the log, the said cuts comprising the width of available wood in the log of full length, whereby the remaining available wood in the log of less than full length is obtained in one piece, which is adapted for cutting into smaller pieces by further cuts parallel with the earlier cuts.

2. The process of trimming boards in the direction of their length by sawing the same by parallel cuts, each of which is substantially parallel with one of the inclined limiting surfaces of the board, whereby the remaining available wood is produced in one triangular-shaped piece which is adapted for cutting into smaller pieces by further cuts parallel with the earlier cuts.

3. The process of sawing tapered logs into boards and the like by producing a plurality of parallel cuts therein, all the said cuts being substantially parallel with one side of the log, the said cuts comprising the width of available wood in the log of full length, whereby the remaining available wood in the log of less than full length is obtained in one piece which is adapted for cutting into smaller pieces by further cuts parallel with the earlier cuts, and in trimming the boards so produced by sawing the same by parallel cuts, each of which is substantially parallel with one of the inclined limiting surfaces of the board, whereby the remaining available wood is produced in one triangular-shaped piece which is adapted for cutting into smaller pieces by further cuts parallel with the earlier cuts.

In witness whereof, we have hereunto signed our names in the presence of two subscribing witnesses.

JOHN EDVARD JOHANSSON.
CARL GUSTAF TIGERSTEDT.

Witnesses:
TORSTAW DAHLBERG,
J. NORDQVIST.